(12) United States Patent
Ljungberg et al.

(10) Patent No.: US 7,697,493 B2
(45) Date of Patent: Apr. 13, 2010

(54) AUTOMATIC SERVICE ACTIVATION

(75) Inventors: Richard Ljungberg, Linkoping (SE);
Daniel Jonsson, Linkoping (SE); Jonas Lundgren, Motala (SE)

(73) Assignee: SAAB AB, Linköping (SE)

( * ) Notice: Subject to any disclaimer, the term of this patent is extended or adjusted under 35 U.S.C. 154(b) by 1104 days.

(21) Appl. No.: 11/162,162

(22) Filed: Aug. 31, 2005

(65) Prior Publication Data

US 2006/0045058 A1 Mar. 2, 2006

(30) Foreign Application Priority Data

Aug. 31, 2004 (EP) .................................. 04020613

(51) Int. Cl.
*H04W 4/00* (2009.01)
(52) U.S. Cl. ...................... 370/338; 455/431
(58) Field of Classification Search ............... 455/431; 370/338, 321
See application file for complete search history.

(56) References Cited

U.S. PATENT DOCUMENTS 6,018,659 A * 1/2000 Ayyagari et al. ........... 455/431

FOREIGN PATENT DOCUMENTS

| DE | 10115793 A1 | 10/2002 |
| WO | WO 93/01576 | * 1/1993 |
| WO | WO 93/01576 A1 | 1/1993 |

\* cited by examiner

*Primary Examiner*—George Eng
*Assistant Examiner*—Michael Faragalla
(74) *Attorney, Agent, or Firm*—Venable LLP; Eric J. Franklin (57) ABSTRACT

Wireless communication systems wherein services involving two or more stations in the system may be activated automatically. Data is communicated between airborne stations according to a TDMA protocol, where the data is transmitted in time slots organized in frames of a repeating frame structure. A link address is associated with at least one time slot. The stations select link addresses for transmission of data according to a self-organizing transmission algorithm. Each station broadcasts data messages of a first type at a first repetition rate and receives such corresponding messages from the other stations. At least based on the received data messages of the first type, each station determines whether a service activation criterion is fulfilled with respect to at least one other station. If the service activation criterion is fulfilled, the station starts to transmit data messages of a second type, which pertain to a service that involves the station itself and the at least one other station.

18 Claims, 3 Drawing Sheets

| | |
|---|---|
| LAC | A1 |
| LAP | A2 |
| LAT | 123 |
| LONG | 456 |
| ALT | 789 |
| VELX | 100 |
| VELY | 200 |
| VELZ | 300 |
| MISN | X1 |
| ⋮ | ⋮ |

Fig. 4a

| | |
|---|---|
| LAC | A3 |
| LAP | A1 |
| LAT | 124 |
| LONG | 457 |
| ALT | 790 |
| VELX | 102 |
| VELY | 204 |
| VELZ | 316 |
| MISN | X1 |
| ⋮ | ⋮ |

AUTOMATIC SERVICE ACTIVATION

FIELD OF THE INVENTION

The present invention relates generally to wireless communication systems where a service involving two or more stations in the system may be activated automatically. More particularly the invention relates to a method of communicating data between airborne stations (A, B) in a time division multiple access system.

BACKGROUND OF THE INVENTION

There are many occasions when the communication demand between two or more stations of a wireless communication system may vary. Particularly, this is true with respect to stations located in air vehicles, such as aircrafts and UAVs (Unmanned Aerial Vehicles). Namely, these types of vehicles are capable of traveling long distances in a relatively short time. Moreover, the possibility and/or requirement to exchange information between two or more stations may be highly dependent upon the distances between the vehicles. Therefore, a protocol for communicating data between airborne stations must be very dynamic and flexible.

An STDMA (Self-organized Time Division Multiple Access) system is capable of handling the communication dynamics and the inherent unpredictability of the airborne stations' behavior. In an STDMA system a self-organizing transmission algorithm is applied to allow simultaneous transmissions from many stations, while minimizing the risk of transmission conflicts. Furthermore, the stations themselves control the usage of the transmission resources, i.e. without any external controlling or polling functions from a base station structure or a corresponding master control entity. However, an external time reference in the form of a ground station or satellite is normally required. As a consequence of the distributed resource control only a partial, or local, organization of the communication resources is possible. Therefore, the self-organizing transmission algorithm must be capable of handling occasional communication conflicts, which are unavoidable when two or more stations which have been located outside one another's communication ranges approach each other, such that their communication ranges suddenly overlap.

Moreover, also when a number of stations are present within one another's communication ranges and the self-organizing transmission algorithm has already enabled a non-conflicting exchange data between the stations situations may arise which render it necessary to establish particular services involving these stations, where the services depend upon particular characteristics of the vehicles and/or the vehicles' spatio-temporal interrelationship. However, there is yet no automatic technical solution as how to handle such situations.

SUMMARY OF THE INVENTION

It is therefore an object of the present invention to alleviate the problem above and thus provide an efficient and reliable solution for establishing services automatically between stations in a time division multiple access system.

According to one aspect of the invention this object is achieved by the method of communicating data as described initially, which is characterized by that a service involving at least two stations may be accomplished via an exchange of data messages of a second type that are transmitted at a second repetition rate, which is different from the first repetition rate. Moreover, the method involves determining in each station, based on any received data messages of the first or second types, whether a service activation criterion is fulfilled with respect to at least one other station. If at least one station finds that this criterion is fulfilled, the method involves transmitting, from each station having found said criterion to be fulfilled, data messages of the second type. These messages are transmitted at the second repetition rate. Preferably, the second repetition rate is substantially higher than the first repetition rate. Furthermore, the data messages of the second type accomplish said service with respect to all stations, which have found said criterion to be fulfilled.

An important advantage attained by this strategy is that a relevant group of stations may be automatically engaged in a service having bearing on the particular vehicles which carry these stations.

According to a preferred embodiment of this aspect of the invention, the method, in each station having found the service activation criterion to be fulfilled, involves determining whether a free link address exists for transmission of data messages of the second type. If at least one such link address is found, the data messages of the second type are transmitted in time slots associated with one of the free link addresses. Thereby, a conflict-free distribution of transmission resources is attained.

According to another preferred embodiment of this aspect of the invention, the data message of the second type includes a current link address field and a previous link address field of the transmitting station. Provided that a station already transmits data messages of the second type at a current link address, the method for this station involves listening for data messages of the second type at all link addresses allocated for transmission of data messages of the second type other than the current link address. Given that the station has transmitted the data messages of the second type at the current link address during at least a minimum time period, the transmission of data messages of the second type is interrupted at randomly selected time slots. During each such time slot the station listens for any data messages of the second type transmitted from other stations at the current link address. If such a transmission is found, the station releases the current link address. Otherwise, the station continues to transmit data messages of the second type at the current link address until a service deactivation criterion is found be fulfilled. This strategy is desirable because thereby the risk of continuing resource conflicts between different stations is avoided. The minimum time period required to cause the interruption in the transmission of the data messages of the second type guarantees that a change of link address will not occur more frequently than what the other stations are expected to be capable of registering and keep track of.

Preferably, in case a station finds that data messages of the second type are in fact transmitted from another station at the particular link address, the method for this station involves determining whether a free link address exists for transmission of data messages of the second type. If so, the station selects one of the free link addresses, and initiates a transmission of data messages of the second type in the time slots associated with the selected link address. Furthermore, the station updates the current and previous link address fields, such that the current link address field specifies the selected link address and the previous link address field specifies the released link address. If, however, no free link address is found the station refrains from transmitting any data messages of the second type, and exclusively listens for such data messages at all link addresses, which are allocated for transmission of data messages of the second type. This strategy is desirable because thereby the risk is minimized that a resource conflict arises between stations which enter each other's communication ranges. Moreover, if a particular station is temporarily barred from transmitting data messages of the second type, this station at least becomes updated with respect to the service related activities regarding the other stations.

Naturally, the listening station may detect link addresses that are freed in the future, so that it then can resume its own transmission. Therefore, according to yet another preferred embodiment of this aspect of the invention, if the listening step detects at least one free link address, the method involves selecting one of the at least one free link addresses; and transmitting data messages of the second type in the time slots associated with the selected link address. Correspondingly, the current and previous link address fields are updated. The current link address field here specifies the selected link address and the previous link address field specifies an initial default address, since in this case there has been no previous link address.

According to still another preferred embodiment of this aspect of the invention, the method involves determining in each station whether the service deactivation criterion is fulfilled based on either received data messages of the first type, or the second type. This step is desirable, since it frees communication resources which are no longer necessary for maintaining the service.

According to another preferred embodiment of this aspect of the invention, the service is an automatic collision avoidance service, for instance implemented by means of an ACAS (Air Collision Avoidance System). The data message of the first type here includes information about the transmitting station's position and velocity, and the service activation criterion relates to an estimated risk for a collision between two or more station carrying vehicles. Moreover, the method involves determining, in each station, a distance between the station and the other stations based on any received data messages of the first or second types. The service activation criterion for a particular station is regarded as fulfilled if the distance between the particular station and at least one other station is less than a first limit distance. Thereby, the service is activated when required, i.e. when the vehicles come hazardously close to each other.

Preferably, the first limit distance is adaptive and depends on a relationship between a velocity vector of the particular station and a respective velocity vector of the at least one other station. This adaptivity is desirable because the estimated collision risk is highly dependent upon the relative speeds of the station carrying vehicles, i.e. the magnitudes and directions of their velocity vectors.

According to yet another preferred embodiment of this aspect of the invention, the service deactivation criterion for the particular station is regarded as fulfilled with respect to another station if the distance between the particular station and the other station exceeds a second limit distance. An advantageous effect of this strategy is that the automatic collision avoidance service thereby may be aborted with respect to all vehicles which are no longer deemed likely to ram one another. Thus, the communication resources used by these stations are freed for alternative purposes.

According to still another preferred embodiment of this aspect of the invention, each station maintains a listing of any current users of the automatic collision avoidance service. For each user this listing contains information about a respective position, velocity, current link address, time stamp indicating a point in time when a latest message of the second type was received at the current link address, and previous link address. Moreover, the listing is repeatedly updated based on data messages of the second type received from at least one other station. Consequently, all stations maintain an adequate database of the positions and velocity vectors of all neighboring stations as well as the communication resources used by these stations. Thereby, the stations may track each other, so that both the risk of resource conflicts is minimized and collisions between the station carrying vehicles are avoided.

According to another preferred embodiment of this aspect of the invention, the service is instead an automatic resource coordination service. The data message of the first type here includes information about at least one resource parameter of a vehicle carrying the respective station, such as a type/amount of weapon, an amount of ammunition or sensor capabilities. The data message of the first type also contains at least one local environment parameter, which is registered by the relevant vehicle. The method involves allocating at least one mission value (e.g. a search area, antenna position or interference frequency) to each of at least two vehicles based on received data messages of the first type. A situation analysis based on any received data messages of the first and second types determines whether the service activation criterion is fulfilled. This coordination is desirable because thereby the available resources may be economized, for instance within a file of aircrafts, and the effects of the resources can be optimized for a given purpose.

According to another aspect of the invention this object is achieved by a computer program directly loadable into the internal memory of a digital computer, comprising software for controlling the method described above when said program is run on a computer.

According to yet another aspect of the invention this object is achieved by a computer readable medium, having a program recorded thereon, where the program is to make a computer perform the method described above.

According to still another aspect of the invention this object is achieved by a station for communicating data as described initially, which is characterized in that a service involving at least two stations in the system is accomplishable via an exchange of data messages of a second type that are transmitted at a second repetition rate, which is different from the first repetition rate. The station includes a processing means, which is adapted to determine whether a service activation criterion is fulfilled with respect to at least one other station based on any received data messages of the first or second types. If this criterion is fulfilled, the processing means is adapted to control the transmitter to transmit data messages of a second type at the second repetition rate. The data messages of the second type pertain to a service that involves the station itself and the at least one other station.

The advantages of this station, as well as the preferred embodiments thereof, are apparent from the discussion hereinabove with reference to the proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DETAILED DESCRIPTION OF THE INVENTION

Figure 1A:
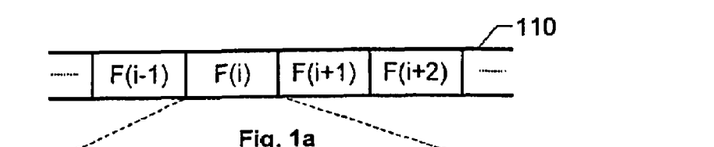
FIGS. 1a-b illustrate a frame and a slot structure in which data is transmitted according to one embodiment of the invention, FIGS. 2a-b schematically illustrate a service activation procedure according to the invention, FIG. 3 schematically illustrates a service maintenance and deactivation procedure according to one embodiment of the invention.

FIG. 1a shows a repeating frame structure 110 in a time division multiple access system according to one embodiment of the invention. Here, each frame F(i−1), F(i), F(i+1), F(i+2) etc. in the frame structure 110 includes a number of time slots s(1), s(2), s(3), . . . , s(n), which are specifically illustrated in FIG. 1b.

Figure 1B:
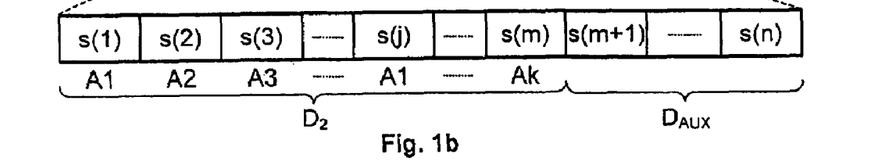

We assume that a sub-set s(m+1), . . . , s(n) of the time slots in each frame F(i) are unavailable because these communication resources are reserved for other purposes. Therefore, the time slots s(m+1), . . . , s(n) cannot be used to communicate data pertaining to a proposed adaptive service that is to be activated automatically and involve two or more stations provided that a service activation criterion is fulfilled with respect to these stations. The data transmitted over the unavailable sub-set of time slots s(m+1), . . . , s(n) is here referred to as $D_{AUX}$. Nevertheless, this data $D_{AUX}$ may include data messages of a first type, which are broadcast at a first repetition rate from each station in the system. For example, the data messages of the first type may include information about the transmitting station's position and velocity, information about a resource parameter of a vehicle carrying the respective station (e.g. weapon types, amounts of ammunition or sensor capabilities) and/or a local environment parameter registered by the vehicle.

According to the invention, a particular link address A1, . . . , Ak is associated with at least one time slot in an available sub-set of time slots s(1), . . . , s(m) in each frame F(i). The link address A1, . . . , Ak is an identifier of a certain transmission resource that may be allocated to a particular station for transmission of data according to a self-organizing transmission algorithm. Moreover, by associating one link address A1 with more than one time slot, e.g. s(1) and s(j), the link address A1 may be repeated at a rate which is a multiple of the frame rate. Thus, if the frame repetition rate is one frame per second, or 1 Hz, the link address repetition rate becomes 5 Hz if one and the same link address is associated with five time slots. For illustrative purposes, FIG. 1a shows the available sub-set of time slots s(1), . . . , s(m) as subsequent time slots in the beginning of the frame F(i). However, according to a preferred embodiment of the invention, the time slots in the available sub-set are distributed as evenly as possible over the frame F(i), so that data can be transmitted in these time slots with a rate being as even as possible.

Figure 2A:
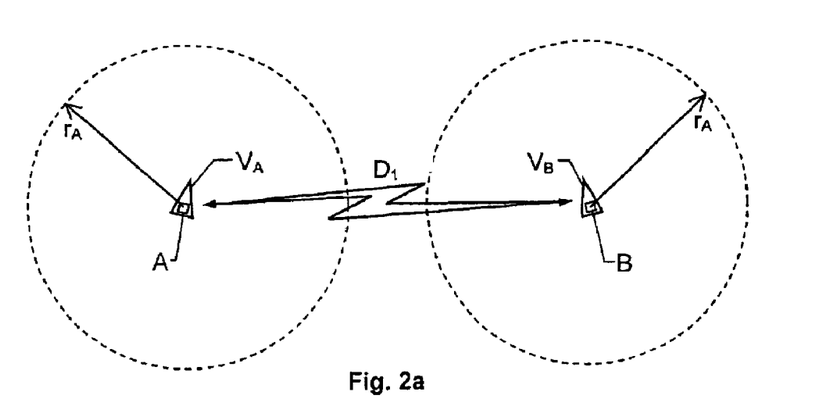

FIG. 2a schematically illustrates two air vehicles $V_A$ and $V_B$, which carry a respective proposed station A and B. Each station A and B broadcasts data messages of a first type $D_1$ at a first repetition rate, for instance via the above-mentioned unavailable sub-set of time slots s(m+1), . . . , s(n). We presume that the stations A and B are located within each other's communication ranges, and that therefore the station A receives the data messages of a first type $D_1$ from the station B, and vice versa.

Furthermore, based on the received data messages of the first type $D_1$, each station repeatedly checks whether a service activation criterion is fulfilled with respect to another station. I.e., here the station A checks if the station B fulfills this criterion and the station B checks if the station A fulfills this criterion.

According to one embodiment of the invention, the service to be activated is an automatic collision avoidance service, and the data message of the first type $D_1$ contains information about the transmitting station's position and velocity. In this case, the service activation criterion relates to an estimated risk for a collision between two or more station carrying vehicles, such as $V_A$ and $V_B$. In order to estimate the collision risks each station A and B determines a distance to the other stations and calculates velocity vectors for the other stations based on the received data messages of the first type $D_1$. This is rendered possible since the data messages of the first type include the relevant position and velocity data. The service activation criterion for a particular station is regarded as fulfilled if the distance between the particular station, say A, and at least one other station, say B, is less than a first limit distance $r_A$. Preferably, the first limit distance $r_A$ is adaptive and depends on a relationship between the velocity vectors of the relevant stations A and B respectively, so that for example comparatively large speed vectors being aimed toward each other correspond to a relatively long first limit distance $r_A$, and comparatively small speed vectors aimed in less critical directions correspond to a relatively short first limit distance $r_A$.

According to another embodiment of the invention, the service to be activated is an automatic resource coordination service, which enables certain resources and tasks to be distributed between different vehicles, for instance when combating targets or performing intelligence operations. In this case, the data message of the first type $D_1$ includes information about at least one resource parameter of the vehicle, e.g. $V_A$ or $V_B$, that carries the respective station A or B. By resources may here be understood an amount and/or type of weapons, an amount ammunition or sensor capabilities. The data message of the first type $D_1$ also includes at least one local environment parameter, which is registered by a sensor of the relevant vehicle $V_A$ or $V_B$. The method involves allocating at least one mission value (e.g. a search area, an antenna position or an interference frequency) to each of at least two vehicles $V_A$ or $V_B$ based on received data messages of the first type $D_1$. The service activation criterion is determined to be fulfilled on the basis of a situation analysis performed on the data messages of the first type $D_1$.

Figure 2B:
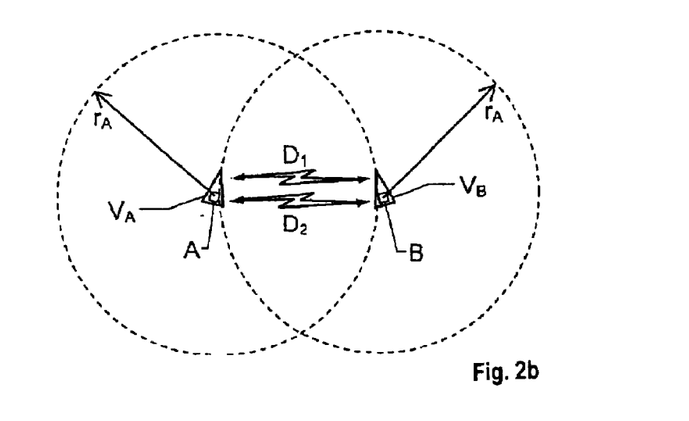

In any case, if the service activation criterion is found to be fulfilled, each station A and B having reached this conclusion initiates a transmission of data messages of a second type $D_2$ at a second repetition rate Thus, through these messages a service involving these stations A and B is accomplished. FIG. 2b illustrates this situation with respect to the stations A and B of FIG. 2a.

Nevertheless, according to the invention, both the stations A and B need not test the service activation criterion exclusively with respect to the data messages of the first type $D_1$. Namely, if a first station, say A, finds the service activation criterion fulfilled based on the data messages of the first type $D_1$ received from a second station, say B, the first station A will start to transmit data messages of the second type $D_2$. Then, the second station, B may also use these messages (i.e. of the second type $D_2$) to test the service activation criterion. An important advantage with this procedure is that the second repetition rate at which the data messages of the second type $D_2$ are transmitted is different from the first repetition rate.

Since the automatically activated service may pertain to a critical communication in connection with collision avoidance or coordination of resources in a combat situation, the second repetition rate is preferably substantially higher than the first repetition rate. Therefore, it is likely that a data message of the second type $D_2$ from the first station A reaches the second station B before a data message of the first type $D_1$ from the first station A reaches the second station B.

Anyhow, when the stations A and B have found that the service activation criterion is fulfilled, each station determines whether a free link address exists for transmitting the data messages of the second type $D_2$. Provided that such resources are available, the stations A and B each selects a free link address, and transmit the data messages of the second type $D_2$ in time slots associated with these link addresses.

During the time following the activation of the service provided via the data messages of the second type $D_2$, interference situations may occur, which require that a current communication be transferred to alternative transmission resources, i.e. link addresses, or that the transmission of the data messages of the second type $D_2$ ceases, either temporarily or permanently.

Figure 3:
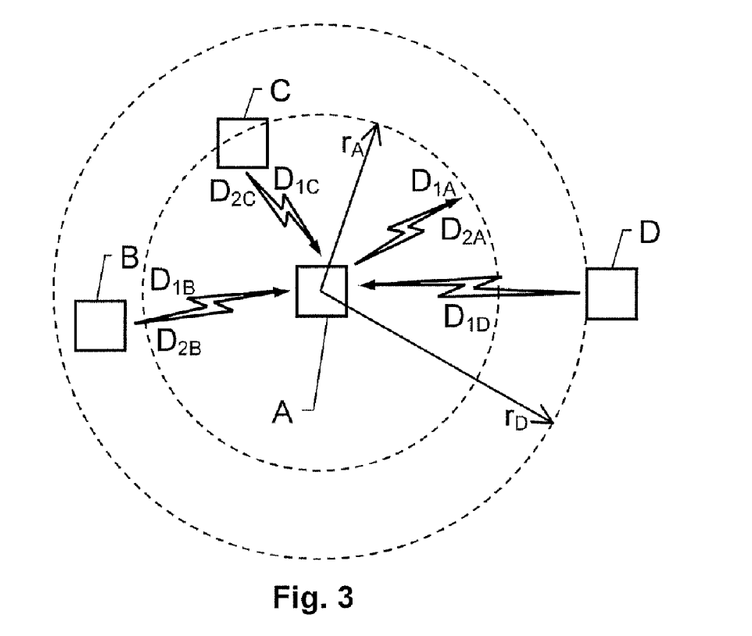

FIG. 3 schematically illustrates this adaptive behavior of the transmission algorithm according to one embodiment of the invention.

In this example, we assume that three stations A, B and D at one point in time have found the service activation criterion to be fulfilled with respect to one another, and therefore these stations exchange data messages of the second type. Each station A, B and D also broadcasts data messages of the first type $D_{1A}$, $D_{1B}$, and $D_{1D}$. Additionally, a station C broadcasts such messages $D_{1C}$, however the service activation criterion has not been fulfilled with respect to this station.

For reasons of simplifying the presentation, the proposed procedure will now only be described with reference to a first station A. However, according to the invention, analogous principles are applied also in the other stations B and D.

For illustrative purposes, the service activation criterion for the station A is here represented by the first limit distance $r_A$ mentioned above. However, of course, according to the invention other service activation criteria are also conceivable. At the current point in time, the station A receives data messages of the second type $D_{2B}$ and $D_{2D}$ from the stations B and D respectively. The station B uses a first link address, say A1, for transmitting these messages and the station D uses a second link address, say A2.

The station C then approaches the station A, and based on the data messages of the first type $D_{1C}$ from the station C, the station A determines that the service activation criterion for the station C is fulfilled. (Of course, the station C reaches the same conclusion with respect to the station A based on the corresponding messages $D_{1A}$ from this station A.) However, before initiating a transmission of data messages of the second type, the station C listens to the ongoing transmissions between the stations A, B and D. Based on this, the station C finds that there are presently no free link addresses available. Therefore, the station C continues to exclusively listen for data messages of the second type $D_{2A}$, $D_{2B}$ and $D_{2D}$ at all the link addresses allocated for transmission of data messages of the second type.

At a later point in time, however, a service deactivation criterion becomes fulfilled based on data messages of the first type $D_{1A}$ and $D_{1D}$ broadcast from the station A and the station D respectively. Alternatively, or as a complement thereto, the service deactivation criterion may be found fulfilled on the basis of the data messages of the second type $D_{2A}$ and $D_{2D}$ exchanged between the stations A and D.

Due to the relative positions and velocity vectors of the vehicles A, B, C and D, the service deactivation criterion is presumed to be fulfilled for the station D also with respect to the stations B and C. Consequently, the exchange of data messages of the second type with the station D is terminated. As a result, the second link address A2 becomes free. Therefore, it is made possible for the station C to initiate a transmission of data messages of the second type $D_{2C}$ on this link addresses A2.

Figure 4A:
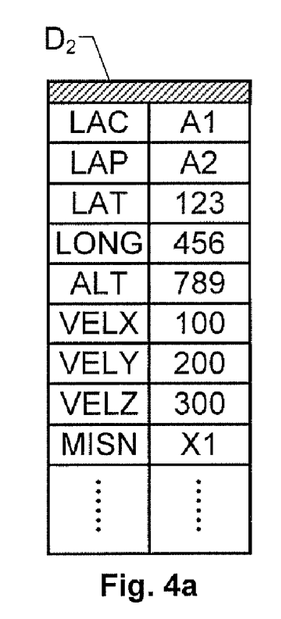
FIGS. 4a-b show data fields which may be included in data messages of a second type that are exchanged between the stations during execution of a service according to one embodiment the invention.

In order to keep track of the stations and their respective usage of the transmission resources, each data message of the second type $D_2$ includes a current link address field LAC of the transmitting station. FIG. 4a shows exemplary data fields LAC, LAP, LAT, LONG, ALT, VELX, VELY, VELZ and MISN, which may be included in the data messages of the second type $D_2$ according to one embodiment of the invention. For example, the data message of the second type $D_2$ may include a previous link address field LAP indicating a link address that was used by the station before changing over to the currently used link address (i.e. indicated by LAC).

With the aim of avoiding continuing resource conflicts between the stations, the following procedure is applied according to one embodiment of the invention. Provided that a station, say A, transmits data messages of the second type $D_2$ at a current link address, e.g. A1, the method for this station A involves listening for data messages of the second type at all link addresses allocated for transmission of data messages of the second type different from the current link address, i.e. A2 up to Ak.

Given that the station A has transmitted the data messages of the second type $D_2$ at the current link address A1 during at least a minimum time period, the station A interrupts its transmission of data messages of the second type $D_2$ at randomly selected time slots. During each such time slot the station A instead listens for any data messages of the second type $D_2$ that may be transmitted from other stations at the current link address A1, for example by the stations B, C and D in FIG. 3. If such a transmission is found, the station A releases its current link address A1, and if possible, continues to transmit the data messages of the second type $D_2$ at a different link address. The minimum time period required to allow the interruption in the transmission of the data messages of the second type $D_2$ guarantees that link address changes will not occur more frequently than what the other stations (e.g. B, C and D) are capable of registering and keep track of. Thereby, each station may maintain an adequate record of which station that currently uses which link address.

If no conflicting transmission is found, the station A continues to transmit data messages of the second type $D_2$ at the current link address A1 until a service deactivation criterion is fulfilled. As mentioned above, each station determines whether the service deactivation criterion is fulfilled based on the received data messages of the first and/or the second type. For example, as discussed above with reference to FIG. 3, the service deactivation criterion for a particular station A may be regarded as fulfilled with respect to another station D if the distance between the station A and the other station D exceeds a second limit distance $r_D$. Analogous with the first limit distance $r_A$, the second limit distance $r_D$ may also be adaptive, and for example depend on the relevant stations' velocity vectors.

Returning now to the FIG. 4a. Specifically, if the station A finds a conflicting transmission of data messages of the second type $D_2$ at the current link address A1, the procedure according to one embodiment of the invention involves determining whether a free link address exists for transmission of the data messages of the second type $D_2$. Here, we assume that the link addresses A3 and Ak are free. Then, the station A selects one of the free link addresses, e.g. A3. Subsequently the station A transmits the data messages of the second type $D_2$ in the time slots associated with the selected link address A3.

Figure 4B:
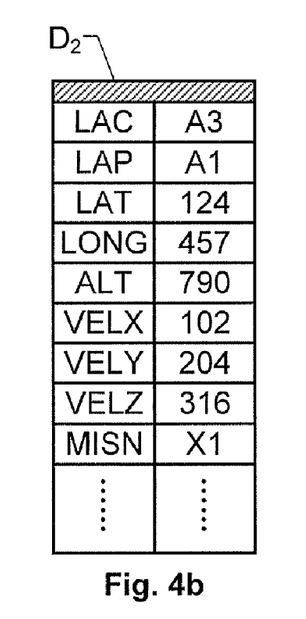

In connection with such a change of transmission resources, the station A updates the current and previous link address fields LAC and LAP of the data message of the second type. This means that the current link address field LAC now specifies the selected link address A3 and the previous link address field LAP specifies the released link address A1. An update of this kind is reflected in FIG. 4b. As can be seen in FIGS. 4a and 4b updates are also made in the data messages of the second type $D_2$ in data fields indicating a vehicle position and velocity LAT, LONG, ALT and VELX, VELY, VELZ respectively. However, this updating is merely a consequence of the fact that the vehicle has traveled a certain distance since the latest data message transmission. Moreover, at least one data field MISN in the data messages of the second type $D_2$ indicates a mission value X1 allocated according to the above-described automatic resource coordination service. Hence, the mission value X1 may relate to a search area, a target area, an antenna position, an interference frequency etc. Based on such mission values X1, resources and tasks can be distributed between different vehicles, for example within a file of aircrafts or a group of UAVS, so that the resources are economized and their effects are optimized to achieve a desired purpose.

Nevertheless, if the station A finds a conflicting transmission of data messages of the second type $D_2$ at the current link address A1, and the station A cannot find a free link address, the station A is unable to transmit data messages of the second type $D_2$. Instead, the station A listens for this type of messages at all link addresses (i.e. A1 to Ak) allocated for transmission of data messages of the second type $D_2$.

Then, if at least one free link address is detected, the method according to one embodiment of the invention involves selecting one of the at least one free link addresses, say A3, to the station A.

Subsequently, the station A transmits data messages of the second type $D_2$ in the time slots associated with the selected link address A3, and the current link address field LAC is updated accordingly. The previous LAP link address field is allocated an initial default address.

Figure 5:
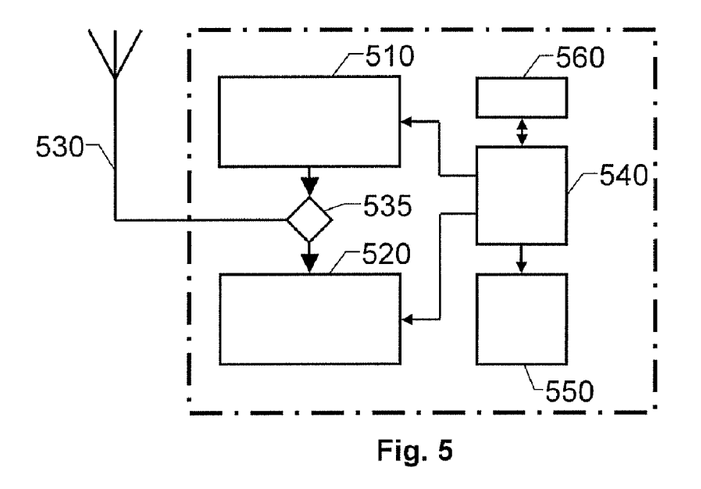
FIG. 5 shows a block diagram over a station according to one embodiment of the invention.

FIG. 5 shows a block diagram over a station for wirelessly communicating data with airborne stations in a time division multiple access system according to one embodiment of the invention. The station includes a transmitter 510, a receiver 520, at least one antenna 530 and a processing means 540.

The transmitter 510 is adapted to broadcast data messages of a first type at a first repetition rate, and the receiver 520 is adapted to receive data messages of the first type from other stations. Either separate antenna systems are used for the transmission and the reception of messages, or the transmitter 510 and the receiver 520 use a common antenna 530, which is accessed via a direction coupler 535.

The processing means 540 is adapted to determine whether a service activation criterion is fulfilled with respect to at least one other station based on any received data messages of the first type or the second type. If this criterion is found to be fulfilled, the processing means 540 is adapted to control the transmitter 510 to transmit data messages of a second type at a second repetition rate, i.e. different from the first repetition rate. According to a preferred embodiment of the invention, the second repetition rate is substantially higher than the first repetition rate. In any case, the data messages of the second type pertain to a service that involves the station itself and the at least one other station.

Preferably, the data message of the second type contains a current link address field and a previous link address field of the station (see FIGS. 4a and 4b). When the station transmits data messages of the second type at a current link address, the processing means 540 is adapted to control the receiver 520 to listen for data messages of the second type at all link addresses allocated for transmission of data messages of the second type different from the current link address. The processing means 540 is also adapted to check whether the station has transmitted the data messages of the second type at the current link address during at least a minimum time period. If so, the processing means 540 is also adapted to control the transmitter 510 to interrupt the transmission of data messages of the second type at randomly selected time slots. During each such time slot, the processing means 540 is adapted to control the receiver 520 to listen for any data messages of the second type being transmitted from other stations at the current link address.

If such a transmission is found, the processing means 540 controls the transmitter 510 to cease its transmission at the current link address, and this link address is released. According to a preferred embodiment of the invention, the processing means 540 is adapted to then determine whether a free link address exists for transmission of data messages of the second type, and if so select one of said free link addresses. Thereafter, the processing means 540 controls the transmitter 510 to transmit data messages of the second type in the time slots associated with the selected link address. In connection with this, the processing means 540 updates the current and previous link address fields, such that the current link address field specifies the selected link address and the previous link address field specifies the released link address. If no free link address is found, the processing means 540 controls the receiver 520 to listen for data messages of the second type at all link addresses allocated for transmission of data messages of the second type.

If, however, no conflicting transmission is found, the processing means 540 controls the transmitter 510 to continue to transmit data messages of the second type at the current link address until a service deactivation criterion is found be fulfilled. According to a preferred embodiment of the invention, the processing means 540 is adapted to determine whether the service deactivation criterion is fulfilled based on received data messages of the first type, the second type or both. For example, the processing means 540 may be adapted to regard the service deactivation criterion for the station as fulfilled with respect to another station if the distance between the station and the other station exceeds a second limit distance. The relevant distance may be determined on the basis of the data messages of the first type as well as the data messages of the second type, since both these messages contain the necessary position information.

According to another preferred embodiment of the invention, the station contains a listing 550 of any current users of the proposed automatically activated service, e.g. ACAS. This listing 550 may include information, which for each user indicates a respective position, velocity, current link address, time stamp indicating the point in time when a latest message was received, previous link address, mission value, weapon type, weapon status, amount of ammunition and sensor capabilities. The processing means 540 is adapted to repeatedly update the listing 550 based on data messages of the second type received from at least one other station.

Preferably, the station also contains a computer readable medium 560 for storing a program, which is adapted to make the processing means 540 accomplish the above-described procedures and functions.

Figure 6:
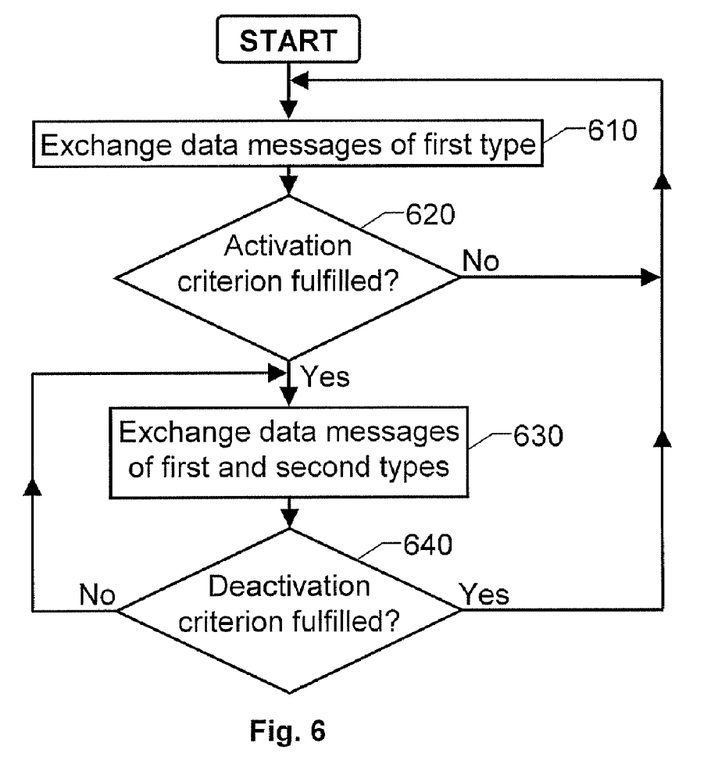
FIG. 6 shows a flow diagram over the general method according to the invention.

In order to sum up, the general method for communicating data between airborne stations according to the invention will now be described with reference to FIG. 6.

A first step 610 exchanges data messages of a first type with at least one other station. I.e. messages of this type are broadcast from a particular station, and this station, in turn, receives corresponding messages from one or more other stations. It is here presumed that the messages are transmitted in time slots, which are organized in frames of a repeating frame structure, that a particular link address is associated with at least one time slot in each frame, and that the stations select link addresses for transmission of data according to a self-organizing transmission algorithm.

A step 620 then checks if, based on the received data messages of the first or second types, a service activation criterion is fulfilled with respect to at least one other station. If this is not the case, the procedure loops back to the step 610. Otherwise a step 630 follows, wherein data messages of a second type are exchanged between the particular station and the at least one other station.

Here, we presume that the data messages of the second type pertain to a service that involves all the stations having found the service activation criterion to be fulfilled, and that the data messages of a second type are transmitted at a second repetition rate, which is different from (and preferably substantially higher than) the first repetition rate.

Repeatedly during this exchange of messages of the second type, a step 640 checks whether a service deactivation criterion is fulfilled with respect to at least one of the stations involved in the service. If the criterion not is fulfilled, the station continues to exchange data messages of the second type. However, if the criterion is fulfilled with respect to at least one other station, the exchange of data messages of the second type is terminated with this station, and the procedure loops back to the step 610 with respect to that station.

All of the process steps, as well as any sub-sequence of steps, described with reference to the FIG. 6 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A method of communicating data between airborne stations in a time division multiple access system, where the data is transmitted in time slots which are organized in frames of a repeating frame structure, a link address for transmission of data is associated with at least one time slot in each frame, the stations selecting link addresses for transmission of data according to a self-organizing transmission algorithm, the method comprising:

broadcasting from each station a data message of a first type at a first repetition rate, receiving in each station data messages of the first type from other stations, wherein a service involving at least two stations being accomplished via an exchange of data messages of a second type that are transmitted at a second repetition rate which is higher than the first repetition rate, determining in each station, based on any received data messages of the first type or the second type, whether a service activation criterion is fulfilled with respect to at least one other station, and if so determining whether a free link address exists for transmission of data messages of the second type, and if so transmitting the data messages of the second type in time slots associated with one of said free link addresses, wherein the data message of the second type comprising a current link address field and a previous link address field of the transmitting station, and provided that a station transmits data messages of the second type at a current link address the method for this station comprising:

listening for data messages of the second type at all link addresses allocated for transmission of data messages of the second type different from the current link address, and provided that the station has transmitted the data messages of the second type at the current link address during at least a minimum time period, interrupting the transmission of data messages of the second type at randomly selected time slots, and during each such time slot listening for any data messages of the second type transmitted from other stations at the current link address, and if such a transmission is found, releasing the current link address, otherwise continuing to transmit data messages of the second type at the current link address until a service deactivation criterion is found be fulfilled.

2. The method according to claim 1, wherein in case the station finds a data message of the second type transmitted from another station at the particular link address, the method for the station comprising:

determining whether a free link address exists for transmission of data messages of the second type, and if so selecting one of said free link addresses, transmitting data messages of the second type in the time slots associated with the selected link address, and updating the current and previous link address fields such that the current link address field specifies the selected link address and the previous link address field specifies the released link address, otherwise listening for data messages of the second type at all link addresses allocated for transmission of data messages of the second type.

3. The method according to claim 2, wherein if in said listening step at least one free link address is detected, the method further comprises:

selecting one of the at least one free link addresses, transmitting data messages of the second type in the time slots associated with the selected link address, and updating the current and previous link address fields such that the current link address field specifies the selected link address and the previous link address field specifies an initial default address.

4. The method according to claim 1, wherein in each station (A, whether the service deactivation criterion is fulfilled based on received data messages of at least one of the first and second types.

5. The method according to claim 1, wherein said service being an automatic collision avoidance service, the data message of the first type comprising information about the transmitting a position and a velocity of the station, and the service activation criterion relating to an estimated risk for a collision between two or more station carrying vehicles, the method further comprising:

determining, in each station a distance between the station and the other stations based on received data messages of the first type or the second type, and regarding the service activation criterion for a particular station as fulfilled if the distance between the particular station (A) and at least one other station (B) is less than a first limit distance.

6. The method according to claim 5, wherein the first limit distance depending on a relationship between a velocity vector of the particular station and a respective velocity vector of the at least one other station.

7. The method according to claim 5, wherein regarding the service deactivation criterion for the particular station as fulfilled with respect to another station if the distance between the particular station and the other station exceeds a second limit distance.

8. The method according to claim 5, wherein maintaining in each station a listing of any current users of the automatic collision avoidance service, the listing for each user comprising information about a respective position, velocity, current link address, time stamp indicating a point in time when a latest message of the second type was received at the current link address, and previous link address, and repeatedly updating the listing based on data messages of the second type received from at least one other station.

9. The method according to claim 1, wherein said service being an automatic resource coordination service, the data message of the first type comprising information about at least one resource parameter of a vehicle carrying the respective station and at least one local environment parameter registered by the vehicle, the method comprising:

allocating at least one mission value to each of at least two vehicles based on received data messages of the second type, and determining whether the service activation criterion is fulfilled based on a situation analysis performed with respect to any received data messages of the first type or the second type.

10. A computer program product, comprising:

a computer readable medium; and computer program instructions recorded on the computer readable medium and executable by a processor for carrying out a method for communicating data between airborne stations in a time division multiple access system, wherein the computer program instructions when executed cause the following steps:

broadcasting from each station a data message of a first type at a first repetition rate, receiving in each station data messages of the first type from other stations, wherein a service involving at least two stations being accomplished via an exchange of data messages of a second type that are transmitted at a second repetition rate which is higher than the first repetition rate, determining in each station, based on any received data messages of the first type or the second type, whether a service activation criterion is fulfilled with respect to at least one other station, and if so determining whether a free link address exists for transmission of data messages of the second type, and if so transmitting the data messages of the second type in time slots associated with one of said free link addresses wherein the data message of the second type comprising a current link address field and a previous link address field of the transmitting station, and provided that a station transmits data messages of the second type at a current link address the method for this station comprising:

listening for data messages of the second type at all link addresses allocated for transmission of data messages of the second type different from the current link address, and provided that the station has transmitted the data messages of the second type at the current link address during at least a minimum time period, interrupting the transmission of data messages of the second type at randomly selected time slots, and during each such time slot listening for any data messages of the second type transmitted from other stations at the current link address, and if such a transmission is found, releasing the current link address, otherwise continuing to transmit data messages of the second type at the current link address until a service deactivation criterion is found be fulfilled.

11. A station for wirelessly communicating data with airborne stations in a time division multiple access system, where the data is transmitted in time slots which are organized in frames of a repeating frame structure, a link address for transmission of data is associated with at least one time slot in each frame, the stations selecting link addresses for transmission of data according to a self-organizing transmission algorithm, the station comprising:

a transmitter adapted to broadcast data messages of a first type at a first repetition rate, and a receiver adapted to receive data messages of the first type from other stations, wherein a service involving at least two stations in the system is accomplishable via an exchange of data messages of a second type that are transmitted at a second repetition rate which is higher than the first repetition rate, the station comprises a processor adapted to determine, based on any received data messages of the first type or the second type, whether a service activation criterion is fulfilled with respect to at least one other station, and if so control the transmitter to transmit data messages of the second type at the second repetition rate to accomplish said service with respect to the station itself and the at least one other station, wherein the data message of the second type comprises a current link address field and a previous link address field of the station, and when station transmits data messages of the second type at a current link address, wherein the processor is adapted to:

control the receiver to listen for data messages of the second type at all link addresses allocated for transmission of data messages of the second type different from the current link address, and provided that the station has transmitted the data messages of the second type at the current link address during at least a minimum time period, control the transmitter to interrupt the transmission of data messages of the second type at randomly selected time slots, and during each such time slot control the receiver to listen for any data messages of the second type transmitted from other stations at the current link address, and if such a transmission is found, release the current link address, otherwise control the transmitter to continue to transmit data messages of the second type at the current link address until a service deactivation criterion is found be fulfilled.

12. The station according to claim 11, wherein in case a transmission of data messages of the second type from another station is found at the current link address, the processor is adapted to determine whether a free link address exists for transmission of data messages of the second type and if so select one of said free link addresses, control the transmitter to transmit data messages of the second type in the time slots associated with the selected link addresses, and update the current and previous link address fields such that the current link address field specifies the selected link address and the previous link address field specifies the released link address, otherwise control the receiver to listen for data messages of the second type at all link addresses allocated for transmission of data messages of the second type.

13. The station according to claim 11, wherein the processor is adapted to determine whether the service deactivation criterion is fulfilled based on received data messages of at least one of the first and second types.

14. The station according to claim 11, wherein said service is an automatic collision avoidance service, the data message of the first type comprises information about the transmitting a position and a velocity of the station, the service activation criterion relating to an estimated risk for a collision between two or more station carrying vehicles, and the processor is adapted to determine a distance between the station and other stations based on any received data messages of the first type or the second type, and regard the service activation criterion as fulfilled if the distance between the station and at least one other station is less than a first limit distance.

15. The station according to claim 14, wherein the first limit distance depends on a relationship between a velocity vector of the particular station and a respective velocity vector of the at least one other station.

16. The station according to claim 13, wherein the processor is adapted to regard the service deactivation criterion for the station as fulfilled with respect to another station if the distance between the station and the other station exceeds a second limit distance.

17. The station according to claim 14, further comprising:

a listing of any current users of the automatic collision avoidance service, the listing for each user comprising information about a respective position, velocity, current link address, time stamp indicating a point in time when a latest message of the second type was received at the current link address, and previous link address, wherein the processor is adapted to repeatedly update the listing based on data messages of the second type received from at least one other station.

18. The station according to claim 11, wherein said service is an automatic resource coordination service, the data message of the first type comprises information about at least one resource parameter of a vehicle carrying the respective station and at least one local environment parameter registered by the vehicle, and the processor is adapted to allocate at least one mission value to each of at least two vehicles based on received data messages of the second type, and determine whether the service activation criterion is fulfilled based on a situation analysis performed with respect to any received data messages of the first type or the second type.

* * * * *